United States Patent Office 3,203,820
Patented Aug. 31, 1965

3,203,820
RHEOLOGICAL AGENT
Malcolm K. Smith and Temple C. Patton, Westfield, N.J., assignors to The Baker Castor Oil Company, Bayonne, N.J., a corporation of New Jersey
No Drawing. Filed May 23, 1962, Ser. No. 196,893
8 Claims. (Cl. 106—316)

The present invention relates to an improved rheological agent which can safely be utilized in paint systems at temperatures considerably higher than was previously possible.

A physically modified form of glyceryl trihydroxystearate (technical grade) has been used as a thixotropic rheological agent of outstanding performance in many respects for oil-base and solvent base systems, such as paints, varnishes, enamels, etc., where fine particle size pigments are dispersed in these liquid vehicles. This rheological agent is used in the form of a very fine powder. The powder passes through a #325 sieve and contains a large proportion of micron and submicron sized particles. This product is herein referred to as wax powder. Despite the excellent behavior of the wax powder in paint systems under normal temperature conditions, it has not been fully satisfactory because of a tendency to "seed" when processed at temperatures above 140° F. Also, even when a satisfactory paint is produced below that temperature, when it is stored for some time at temperatures higher than 150° F., the seeds slowly develop. By seeds, we mean the formation of faintly discernible soft gels which give the paint a poor appearance in the can and reduce the fineness of grind of the paint when brushed out on a substrate or checked on a fineness of grind gauge.

It has now been discovered that the temperature at which seeding occurs can be raised to at least 180° F. by incorporating a moderate amount of an amide of hydroxystearic acid. With this improved performance, the rheological agent produced is fully satisfactory for practically all types of paint formulating and processing. This agent can be used at temperatures from 40° to 60° higher than previously possible in paint systems, while still avoiding seeding.

The hydroxystearate amides used to impart this improved performance are rather poor rheological agents by themselves as compared to the wax powder. They are less than half as effective in imparting viscosity increase and give paints which do not brush out as smoothly as those made with the wax powder. However, when they are substituted in relatively small amounts, such as from 15–30 parts out of 100 parts of wax powder, they serve as a protective agent by substantially raising the temperature at which the wax powder forms seeds. It is believed this may be an association effect, perhaps of hydrogen bonding, related to the unique combination of nitrogen and hydroxyl groups of the hydroxystearate amides, but the invention is not predicated upon any particular theory. Hydroxystearate amides, for example those based on tetraethylene pentamine, triethylene tetramine, imino-bis-propylamine, ethylene diamine and diethyl triamine, definitely have this ability to inhibit seeding, with the ethylene diamine product being the preferred one. On the other hand, amides of certain acids other than hydroxystearic acid failed the two-hour seeding test described below: namely, octadecylamide, hydrogenated tallow amide, methylene-bis-stearamide, stearamide, behenamide, oleamide and olea/stearamide.

The following examples are illustrative, but not limiting of the invention. Except where otherwise stated herein, parts are by weight. The evaluation techniques are here described.

EVALUATION TECHNIQUES

Wax powder modified with various amide waxes was evaluated in an architectural alkyd gloss enamel to determine any improvements in performance. This enamel was formulated at 27% pigment volume content with a long oil oxidizing alkyd resin meeting Federal specification TT–R–266a Type I. The wax powder and modifications thereof were used at the level of four pounds per 100 gallons of paint, a level of use which is known to impart fully satisfactory sag control, viscosity increase and control of pigment settling. Evaluation therefrom centered upon subjecting these paints to higher temperature to determine the extent to which seeding had been suppressed or overcome.

An accelerated heat aging test was used which correlates with manufacture of the paint in high speed equipment which causes the paint to heat up. This test also reasonably represents what would happen to the paint after prolonged storage in a hot warehouse such as in the southern U.S.A.

Half-pint samples of each paint were heated in an oven for two hours at 180° F. The paint was then allowed to cool gradually and upon reaching room temperature was checked for any development of seeds by means of a fineness of grind paint gauge.

Examples

In each example the above described evaluation technique was applied as stated above to the rheological agent formulation. The wax powder in each instance was as described above, and the amide in Examples 2–8 was the reaction product of ethylene diamine and hydroxystearic acid. In every example the wax powder-amide mixture was finely divided to pass through a #325 sieve and contained a large proportion of micron and submicron sized particles. The results of this test were as follows:

| Example | Wax powder-amide ratio | Seeding Test (2 hrs. at 180° F.) |
|---|---|---|
| 1 | 100/0 | Heavy seeding. |
| 2 | 90/10 | Slight seeding. |
| 3 | 85/15 | Some seeding. |
| 4 | 80/20 | No seeding. |
| 5 | 78/22 | Do. |
| 6 | 70/30 | Do. |
| 7 | 60/40 | Do. |
| 8 | 50/50 | Do. |

Weight percentages of amide in excess of 60% were effective in preventing seeding, but other characteristics of the agent, such as anti-sag, were inferior.

It is apparent from the above data that protection from this amide wax can be obtained at very reasonable levels. Using the adequate ratio of 80/20 wax powder to amide, we then proceeded to observe the effectiveness of other hydroxystearate amides as listed below. These were all tested precisely as described above and were found to show no seeding after two hours at 180° F.

| Example | Amide |
|---|---|
| 9 | Tetraethylene pentamide of hydroxystearic acid. |
| 10 | Triethylene tetramide of hydroxystearic acid. |
| 11 | Diethylene triamide of hydroxystearic acid. |
| 12 | Imino-bis-propylamide of hydroxystearic acid. |

The amides used in Examples 8–12 may be effectively incorporated with the wax powder in amounts from 20% to 60% based upon the total weight of the total rheological agent to inhibit or prevent seeding.

While certain present preferred embodiments of the invention have been described herein, it is to be understood that the invention may be otherwise embodied and practiced in accordance with the appended claims.
What is claimed is:

1. A rheological agent consisting essentially of finely divided glyceryl trihydroxystearate and from about 20% to about 60% of ethylene diamide of hydroxystearic acid based upon the total weight of the agent.

2. A rheological agent consisting essentially of finely divided glyceryl trihydroxystearate and from about 20% to about 60% of triethylene tetramide of hydroxystearic acid based upon the total weight of the agent.

3. A rheological agent consisting essentially of finely divided glyceryl trihydroxystearate and from about 20% to about 60% of tetraethylene pentamide of hydroxystearic acid based upon the total weight of the agent.

4. A rheological agent consisting essentially of finely divided glyceryl trihydroxystearate and from about 20% to about 60% of diethylene triamide of hydroxystearic acid based upon the total weight of the agent.

5. A rheological agent consisting essentially of finely divided glyceryl trihydroxystearate and from about 20% to about 60% imino-bis-propyl amide of hydroxystearic acid based upon the total weight of the agent.

6. A rheological agent consisting essentially of glyceryl trihydroxystearate and from about 20% to about 60% by weight, based upon the total weight of said agent, of a hydroxystearate polyamide which inhibits the seeding of said rheological composition.

7. A rheological agent consisting essentially of glyceryl trihydroxystearate and from about 20% to 60% by weight, based upon the total weight of said agent, of a hydroxystearate polyamide, which inhibits the seeding of said rheological composition, the rheological agent being finely divided.

8. The method of improving the rheological properties of a paint product, which comprises proportionately adding to said paint product a mixture of glyceryl trihydroxystearate and from about 20% to 60% by weight, based upon the total weight of said mixture, of a hydroxystearate polyamide which inhibits the seeding of said rheological composition.

References Cited by the Examiner
UNITED STATES PATENTS

| | | | |
|---|---|---|---|
| 2,849,400 | 8/58 | Hotten | 260—404.5 |
| 2,849,401 | 8/58 | Hotten | 260—404.5 |
| 2,996,396 | 8/61 | Schroeder et al. | 106—287 |
| 3,096,193 | 7/63 | Tinker et al. | 106—287 |

MORRIS LIEBMAN, *Primary Examiner.*